United States Patent [19]

Yamaguchi

[11] 4,286,919

[45] Sep. 1, 1981

[54] APPARATUS FOR PUMPING OPERATION OF A HYDRAULIC MACHINE HAVING FRANCIS TYPE RUNNER

[75] Inventor: Yuzo Yamaguchi, Hitachi, Japan

[73] Assignee: Hitachi, Ltd., Tokyo, Japan

[21] Appl. No.: 103,385

[22] Filed: Dec. 13, 1979

[51] Int. Cl.³ .......................... F01D 3/00; F01D 11/02
[52] U.S. Cl. ............................... 415/112; 415/170 A; 415/176
[58] Field of Search ........... 415/110, 111, 112, 170 A, 415/176

[56] References Cited

U.S. PATENT DOCUMENTS

| 3,236,499 | 2/1966 | Chatfield et al. | 415/112 |
| 3,253,816 | 5/1966 | Sproule | 415/170 A |
| 3,516,757 | 6/1970 | Baumann | 415/112 |
| 4,196,910 | 4/1980 | Aizu | 415/111 |

FOREIGN PATENT DOCUMENTS 49-12244  7/1974  Japan.
1161159   8/1969  United Kingdom ............... 415/170 X

*Primary Examiner*—Robert E. Garrett
*Attorney, Agent, or Firm*—Thomas E. Beall, Jr.

[57] ABSTRACT

An apparatus for operating a hydraulic machine having a Francis type runner provided with a multi-stage seal between the inner peripheral surface of the runner and the stationary part. The apparatus has a water extracting pipe opening at its one end to one of the seal stages of the multi-stage seal and to a draft tube at its other end. A valve disposed in the water extracting pipe is adapted to be opened when the water head has become greater than a predetermined level during the pumping operation of the hydraulic machine.

5 Claims, 5 Drawing Figures

APPARATUS FOR PUMPING OPERATION OF A HYDRAULIC MACHINE HAVING FRANCIS TYPE RUNNER

BACKGROUND OF THE INVENTION

The present invention relates to a hydraulic machine having a Francis type runner such as pump and pump turbine and, more particularly, to a system for operating such a type of hydraulic machine.

The hydraulic machine of the kind stated above has a runner carried by a shaft which in turn is directly connected to a motor or a motor generator. The runner is accommodated by a casing into which the water to be pumped is introduced through guide vanes and stay vanes.

If the hydraulic machine is the pump turbine, it operates also as a water wheel. In such a case, the runner is driven by water introduced from the casing through the guide vanes and stay vanes, to drive the motor generator which in this case produces the electric power. Thus, in the Francis type runner streams of water are formed in one and the other flowing directions depending on whether the hydraulic machine is used as a pump or a turbine.

As well known to those skilled in the art, the Francis type runner has a crown ring constituting the upper part of the runner, a shroud ring constituting the lower part of the runner and having a central bore presenting the passage for the water, and a plurality of blades disposed between these rings. As the water head becomes greater, the ratio of the radius of the runner to the height of the runner is increased so that the runner has a generally flattened form. When the pump turbine is used as a pump, water is sucked into the runner from a draft tube which openes to the lower side of the runner, through the opening formed in the shroud ring, and is then discharged in the horizontal direction from the periphery of the runner. To the contrary, when the pump turbine is used as a turbine, water flows in the horizontal direction into the runner through the periphery of the latter, and is discharged into the draft tube from the center of the runner.

The periphery of the runner is opposed by a stationary member. Also, an upper cover is disposed above the crown ring, while a lower cover is disposed below the shroud ring. The lower cover has portions opposing to the periphery of the runner (the outer peripheral surface of the shroud ring) and to the inner peripheral surface of the shroud ring. A lateral pressure chamber is defined between the lower cover and the shroud ring. In the opening of the lateral pressure chamber, i.e. in the gaps between the shroud ring and the outer and inner peripheral surfaces of the lower cover, provided are seals constituted by sealing members opposing to each other with small clearance left therebetween. These seals are effective in diminishing the rate of the water leakage from the periphery of the runner to the draft tube through the lateral pressure chamber.

However, as the water head becomes large, the rate of leak of the water into the lateral pressure chamber becomes also large to the increase of the rate of the water leakage decreases the effective work of the pump turbine.

To overcome this, it is a current measure to constitute the inner seal by a plurality of stages. The reason why the inner seal rather than the outer seal is formed in multiplicity of stages is as follows. If the outer seal is formed in a plurality of stages, the increased thickness of runner for providing the multiplicity of stages will inconveniently increase the centrifugal force to require a greater mechanical strength of the runner. In both cases of the pump and turbine operations, a higher pressure is established at the outer peripheral portion than at the inner peripheral portion of the runner. Therefore, the water comes into the lateral pressure chamber mainly through the outer seal. The pressurized water flows also into a back pressure chamber defined between the crown ring and the upper cover, so that it becomes necessary to adjust the vertical thrust acting on the runner. To this end, it is necessary to provide a multi-stage seal also between the crown ring and the upper cover, which in turn requires a further increased strength of the runner.

Due to, for example, these reasons, the inner seal is constructed in a multiplicity of stages and the adjustment of thrust is achieved by leading the pressurized water from the back pressure chamber to the lateral pressure chamber. However, high pressure water in the lateral pressure chamber discharge to the lower side of the runner through the multi-stage seal and adversely affect the performance of the pump turbine particularly when the latter is operating as a pump.

More specifically the flow of water discharged into the draft tube through the multi-stage inner seal has a velocity component in the direction of rotation of the runner. As a result, the swirl in the same direction as the runner is applied to the pumped water, and the pumping performance deteriorates. Also, the vigorous eddy currents are formed in the area to which the pressurized water is discharged and the runner is undesirably eroded by the cavitation generated in the eddy currents. These drawbacks are all attributable to the discharging of the pressurized water through the multi-stage inner seal to the suction side of the runner during the pumping operation. Thus, these drawbacks will be eliminated by taking a suitable measure for preventing the pressurized water from being discharged through the inner seal, and erosion of the runner will be eliminated, too.

From this point of view, Japanese Patent Laid-open No. 12244/73 proposes a pump turbine in which the pressurized water is discharged from the lateral pressure chamber or from a chamber defined beneath the inner seal. However, when the pressurized water is discharged from the side pressure chamber, the pressure in the latter is inconveniently lowered to incur an increase of the downward thrust to cause an overload of the bearing supporting the shaft. Also, when the water is discharged from the chamber defined beneath the inner seal, it is necessary to discharge the pressurized water at a large rate so that the water discharged through the inner seal may not reach the inside of the draft tube. In order to discharge the water at a large rate, also the water in the draft tube is sucked and then discharged. Even if the water coming through the seal is solely discharged, the seal in this prior art is a single stage seal to permit the discharge of a large amount of water from the lateral pressure chamber. Thus, this measure is materially equivalent to the direct discharge from the lateral pressure chamber.

Meanwhile, the specification of U.S. Pat. No. 3,253,816 discloses a technic in which the mixture of water and air are discharged through the inner seal, during the pumping operation of the pump turbine. More specifically, in this prior art, the space around the rotary body (runner) is filled with air to reduce the friction of the fluid during the rotation of the runner. Thus, during the pumping operation, the lateral pressure chamber contains almost no water, and the water discharged through the seal is a part of the water which has leaked through the outer peripheral seal of the runner and a part of the water which has been introduced through the inner seal from the draft tube due to the centrifugal force. Therefore, this prior art has nothing to do with the problem of bad influence of the water discharged through the inner seal. In addition, the hydraulic machine to which this prior art is applied has no multi-stage seal.

SUMMARY OF THE INVENTION

It is, therefore, an object of the invention to provide such an apparatus for operating a hydraulic machine having a Francis type runner as adapted to extract water from a multi-staged inner seal of the runner when the rate of discharge of water through that seal is increased to such an extent as to affect the pumping power of the machine.

To this end, according to the invention, there is provided an apparatus having a water extracting tube opening to the multi-stage inner seal and adapted to extract the water from that seal as desired thereby to prevent the deterioration of performance of the machine during pumping operation. The timing of water extraction and the portion of the seal at which the water extraction is made are suitably determined to permit a high efficiency of the pumping operation.

These and other objects, as well as advantageous features of the invention will become more clear from the following description of the preferred embodiments taken in conjunction with the accompanying drawings.

DESCRIPTION OF THE PREFERRED EMBODIMENTS

Figure 1:
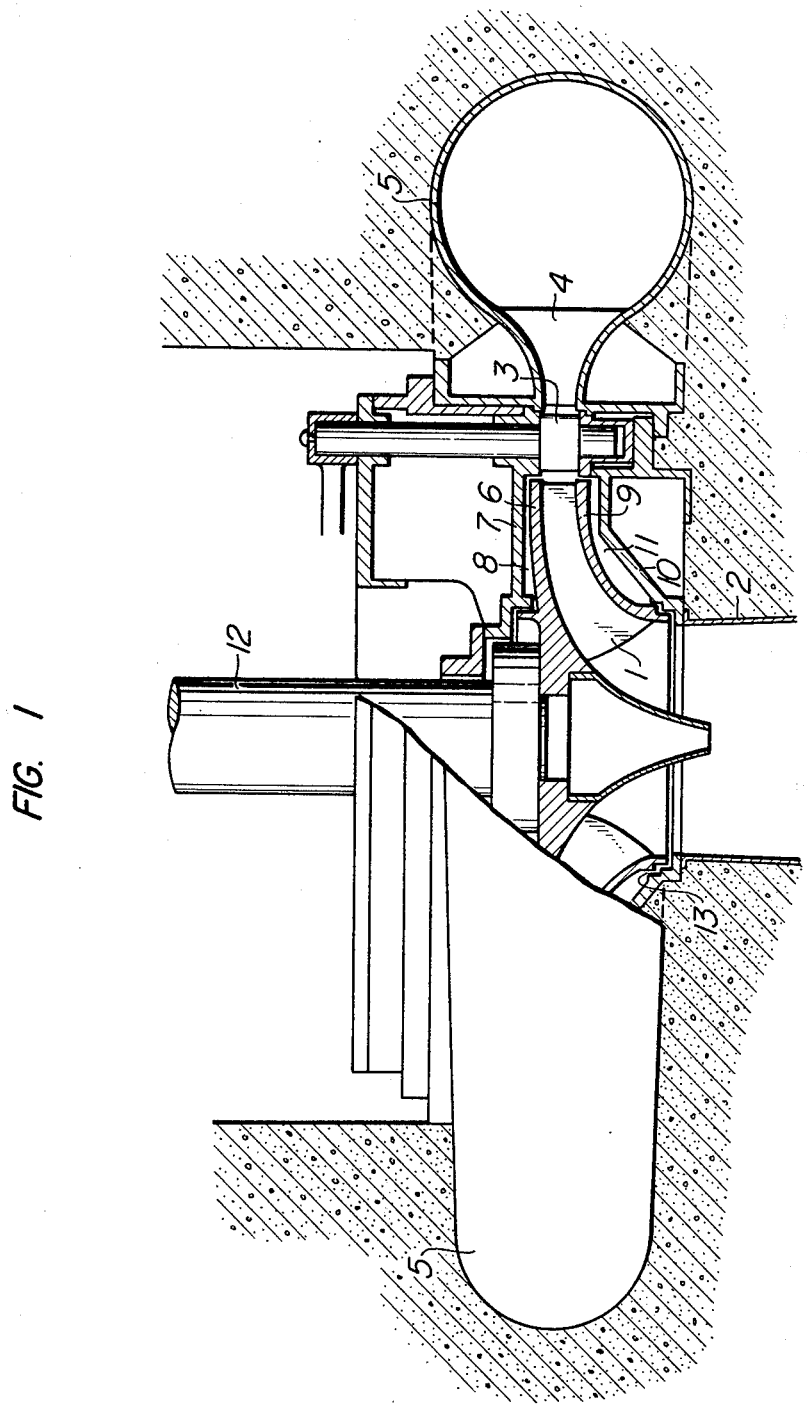
FIG. 1 is a sectional view of a hydraulic machine having a Francis type runner, showing particularly the runner and parts around the runner.

A hydraulic machine having a Francis type runner has a construction as shown in FIG. 1. During the pumping operation, a runner 1 is rotated in the direction of the pumping operation by means of a motor (not shown) which is directly connected to the runner through a shaft 12 so that water is sucked from a lower reservoir (not shown) into the runner through a draft tube 2 which opens to the lower side of the runner 1, and is given energy. The water is then pressurized as it passes through the runner 1 and is discharged from the periphery of the latter into a casing 5 through guide vanes 3 and stay vanes 4. The water then flows into an upper reservoir (not shown) through a penstock (not shown). The runner 1 has a crown ring 6 which defines in cooperation with an upper cover 7 a back pressure chamber 8. The runner further has a shroud ring 9 which cooperates with a lower cover 10 in defining therebetween a lateral pressure chamber 11. The high pressure water discharged from the runner 1 (introduced to the runner 1 in case of a turbine operation of the machine) is introduced into the back pressure chamber 8 and the lateral pressure chamber 11 and produces downward and upward thrusts to the runner.

Figure 2:
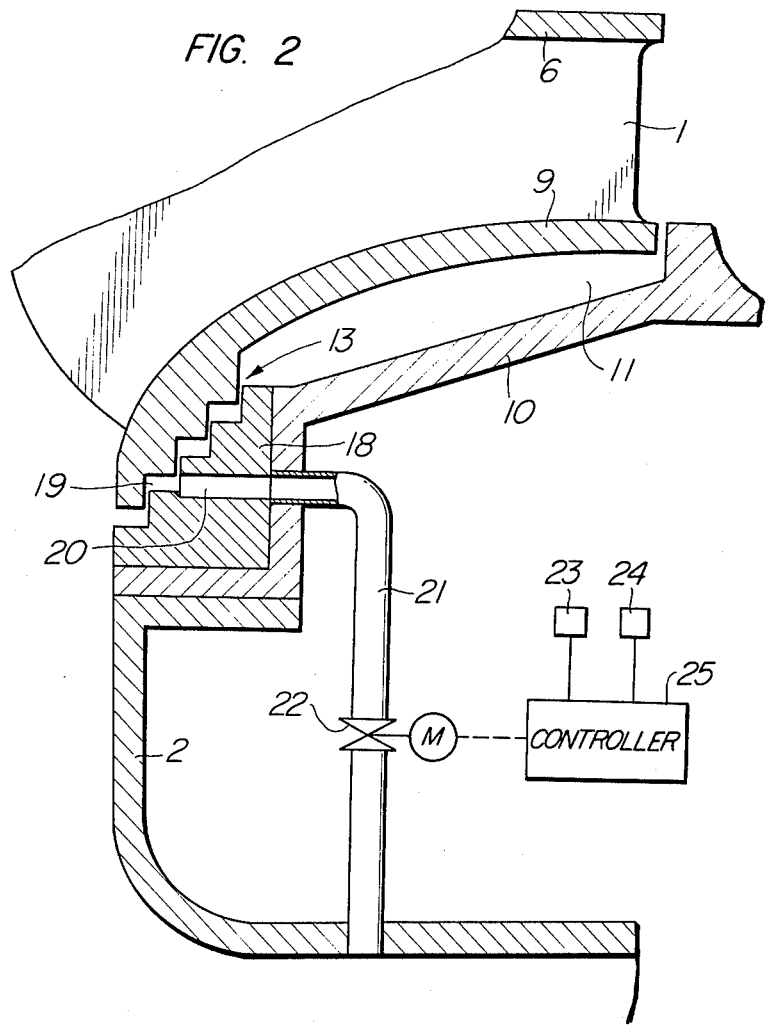
FIG. 2 is an enlarged view of a part of the hydraulic machine, showing particularly a multi-stage seal and an operation apparatus of the invention associated with the multi-stage seal.
Figure 3:
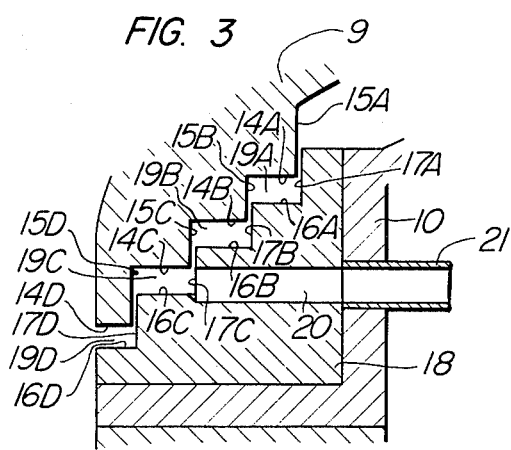
FIG. 3 shows the detail of the multi-stage seal.

Seals are formed between the outer peripheral surface of the crown ring 6 and the upper cover 7 and between the outer peripheral surface of the shroud ring 9 and the lower cover 10. Also, a seal 13 is formed between the inner peripheral surface of the shroud ring 9 and the lower cover 10 as shown in FIG. 2. As shown in detail in FIG. 3, this seal 13 is constituted by a plurality of stages. More specifically, a plurality of stepped horizontal surfaces 14A, 14B, 14C, 14D and a plurality of vertical surfaces 15A, 15B, 15C, 15D are formed on the inner peripheral surface of the shroud ring 9. These horizontal surfaces and vertical surfaces are opposed by, respectively, stepped horizontal surfaces 16A, 16B, 16C, 16D and vertical surfaces 17A, 17B, 17C, 17D formed on a seal liner 18. Thus, four stages of seal are formed at the opposing vertical surfaces. Also, four pressure attenuation chambers 19A, 19B, 19C, 19D are defined by cooperation of the horizontal and vertical surfaces of the shroud ring and the seal ring.

In the vertical wall 17C of the attenuation chamber 19C second from the most downstream one 19D, i.e. the annular chamber defined by horizontal surfaces 14C, 16C and vertical surfaces 15D, 17C, opened are a plurality of communication bores 20 which extends radially outwardly through the seal liner 18. Each of the communication bores 20 openes at its outer end to a water extracting pipe 21 which opens to the draft tube 2. The pressurized water introduced into the attenuation chamber 19C is selectively discharged into the draft tube 2 as a valve 22 provided in the water extracting pipe 21 is opened and closed as shown in FIG. 2. The valve operation is controlled by means of a controller 25 which is adapted to produce opening and closing instructions upon receipt of signals representing the state of operation of the hydraulic machine, e.g. an operation mode signal 23, water head signal 24 and so forth.

In pumping operation of the hydraulic machine having the described construction, a part of the pressurized water discharged from the runner 1 is introduced into the lateral pressure chamber 11 through the outer peripheral seal around the shroud ring 9, and is further introduced to the attenuation chamber 19A through the seal stage formed by vertical surfaces 15A, 17A of the multi-stage seal 13. The pressure of the water is decreased as the latter flows through this seal stage. The water further flows into the next attenuation chamber 19B through the seal stage formed between the surfaces 15B, 17B so that the pressure of the water is further decreased. The water pressure is still further lowered as the water flows into the attenuation chambers 19C, 19D.

At the starting of the pumping operation of the pump turbine, the discharge water head is not so high, so that the pressure of the water discharged horizontally from the final attenuation chamber 19D into the draft tube 2 is low. Therefore, the stream of the pumped water is not substantially affected by the water discharged through the seal.

As the pumping operation is continued, the discharge water head becomes high gradually, so that the pressure of the water introduced into the lateral pressure chamber 11 is increased accordingly. Consequently, the pressure of the water discharged from the final attenuation chamber 19D is increased to adversely affect the stream of the pumped water. The influence of the water discharged from the final attenuation chamber becomes remarkable as the water head is increased to a certain level. Namely, the aforementioned deterioration of the pumping performance and the cavitation start to appear.

The level of the water head at which the influence of the water discharged from the final attenuation chamber becomes remarkable differs depending on the specification or characteristic of the Francis runner and the operating condition such as the runner speed. It is, however, possible to know beforehand this level by a calculation if the necessary factors are given or model experiments.

When the influence of the water discharged through the inner peripheral seal 13 becomes innegligible, the valve 22 of the water extracting pipe 21 is opened to release the water from the attenuation chamber 19C into the draft tube 2. By so doing, the leakage of the water from the attenuation chamber 19C to the final attenuation chamber 19D is decreased or nullified, so that the discharge of the water from the final attenuation chamber, which would adversely affect the stream of the pumped water, is suppressed to avoid the deterioration of the pumping performance.

The effect of the water extraction can be achieved to some extent by arranging such that the communication bores 20 open to the other attenuation chambers e.g. attenuation chambers 19A, 19B or 19D than the attenuation chamber 19C. However, supposing here that the water extraction is made from the first attenuation chamber 19A, it is necessary to extract the water at a large rate in order to prevent the pressurized water from leaking into the downstream attenuation chambers 19A–19D, because the pressure of the water in the first attenuation chamber 19A, which has passed only the first stage seal, is much higher than the pressure in the subsequent attenuation chamber 19B. The extraction of water at such a large rate may cause a drastic pressure drop in the lateral pressure chamber. In such a case, a large downward thrust is applied to the runner to require a troublesome adjustment for obtaining the balance of the thrusts. To the contrary, the water extraction at the final attenuation chamber 19D requires such an arrangement that the water in the draft tube 2 is also sucked, as stated before in connection with Japanese Patent Laid-open No. 12244/1974, and it is extremely difficult to extract solely the water on the periphery of the final stage attenuation chamber 19D, uniformly.

Thus, the position of water extraction in the inner peripheral seal 13 should be selected such that the pressure drop in the lateral pressure chamber caused by the water extraction is not so large as to require a specific adjustment of the upward and downward thrusts, and that the sucking of the water from the draft tube 2 through the inner peripheral seal does not take place. For these reasons, it is recommended that the water is extracted from the attenuation chamber which is second from the final one.

Figure 4:
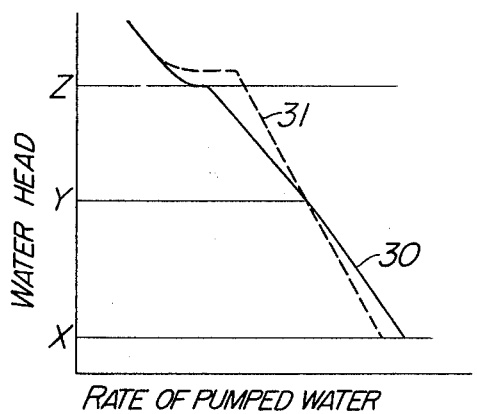
FIG. 4 is a diagram showing the pumping characteristic of the hydraulic machine.

FIG. 4 shows the relationship between the water head and the flow rate of the pumped water. The characteristic obtained when the valve 22 is kept closed, i.e. the characteristic of the conventional hydraulic machine having multi-stage inner peripheral seal is shown by a full-line curve 30, while the characteristic as observed when the valve 22 is kept opend is shown by a broken-line curve 31.

At a moment immediately after the commencement of the pumping operation at which the water head is still low as X, the flow rate of pumped water is greater when the valve 22 is closed (full-line curve 30) than when the valve 22 is opened (broken-line curve 31). This is because the part of the pumped water is extracted through the water extraction pipe 21. As the water head is increased to Y, however, the flow rates of the pumped water in both modes come to equal to each other.

It will be observed also that the broken-line curve 31 shows greater flow rate of pumped water than the full-line curve 30 once the water head is increased beyond Y. This tells that the increase of the pumping capacity afforded by the opening of the valve 22 exceeds the reduction of the water flow rate attributable to the extraction of the water.

From the above consideration, it is derived that the higher efficiency of the pumping operation is obtained by operating the hydraulic machine such that at first the valve 22 is closed and then opened as the increase of the water head to Y is detected.

Figure 5:
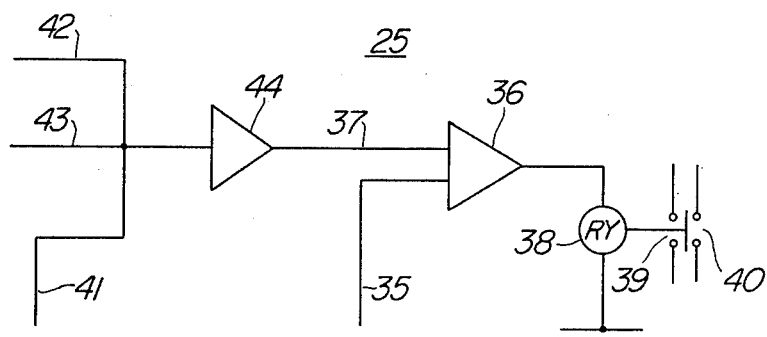
FIG. 5 is a block diagram of an example of control system for controlling the pumping operation of the hydraulic machine.

A practical example of the controller 25, suitable for use in the control of operation of pump turbine of a pump-up power station is shown in FIG. 5.

The water head Y shown in FIG. 4, i.e. the timing of opening of the valve 22 differs depending on the characteristic of the runner, and can be known by a calculation or measurement for a specified runner. A signal 35 representative of this water head Y is delivered to a comparator 36 to which also delivered is a signal 37 representative of the actual water head. A relay 38 closes its contact 39 when the level of the signal 37 is higher than that of the signal 35, i.e. when the actual water head is higher than the water head Y. As a result, a driving mechanism (not shown) for the valve 22 is actuated to open the valve 22. When the level of the signal 37 is lower than that of the signal 35, i.e. when the actual water head has not reached yet the water head Y, the relay 38 closes the contact 40 to close the valve 22. This control of opening and closing of the valve 22 permits a pumping operation at high efficiency, because the characteristic of the machine follows the full-line curve 30 of FIG. 4. When the actual water head is lower than the water head Y and the broken-line curve 31 after the actual water head is increased beyond the water head Y.

The signal 37 representative of the actual water head is produced in a manner described hereinunder.

A pump-up power station has dams disposed above and below the machine parts. The water level in these dams are changed during the pumping or turbine operations of the plant. In most cases, the amplitudes of the changes of the water levels in both dams do not coincide with each other. Therefore, a water head signal 24 corresponding to a reference water head is used as a bias 41 to which added by means of an operation unit 44 are a signal 42 representing the change of water level in the upper dam and a signal 43 representative of the change in the water level in the lower dam, thereby to produce the signal 37 representative of the actual water head.

The water head can be converted into pressure. It is, therefore, possible to represent the water head Y by a pressure level and to operate the relay 38 while observing the pressure in, for example, the pump casing 5.

This controller works effectively even when the hydraulic machine is designed and constructed specifically for the pumping. In such a case, if the hydraulic machine is intended for pumping and discharging the water to somewhere of a higher level, the actual water head is changed depending solely upon the change in the water level in the lower dam. In this case, the signal 37 will exhibit only a small change and the valve 22 will be held in either the closed or opened state.

As has been described, according to the invention, the water of high pressure in the multi-stage inner peripheral seal of the runner is automatically released and extracted upon detect of an increase of the pumping water head to such a level as will cause a deterioration of the pumping performance by the water discharged through the multi-stage seal into the stream of the pumped water.

It is therefore possible to operate the hydraulic machine having Fancis type runner at a high efficiency.

What is claimed is:

1. An apparatus for pumping operation of a hydraulic machine having a Francis type runner constituted by a crown ring, a shroud ring and a plurality of blades interposed therebetween, characterized by comprising:
   a multi-stage seal including a plurality of seal stages defined between the inner peripheral surface of said shroud ring and a stationary part opposing to said inner peripheral surface of said runner;
   pressure attenuation chambers disposed between adjacent seal stages and adapted to attenuate the pressures of water having passed respective seal stages;
   a water extracting pipe opening to at least the pressure attenuation chamber second from the final and adapted to release the pressurized water from said attenuation chamber; and
   a valve disposed in said water extracting pipe and adapted to be opened and closed to permit and interrupt the water extraction from said attenuation chamber through said water extracting pipe.

2. An apparatus as claimed in claim 1, characterized by further comprising a controller adapted to open said valve to permit the water extraction from said attenuation chamber when the actual water head has become greater than a predetermined water head.

3. An apparatus as claimed in claim 1, where said shroud ring and said stationary part opposing to said shroud ring have a plurality of vertical and horizontal surfaces, said vertical surfaces of said shroud ring and said stationary part or said horizontal surfaces of said shroud ring and said stationary part being opposed by each other with small clearance left therebetween, thereby to form said seal stages, while said horizontal surfaces of said shroud ring and said stationary part or said vertical surfaces of said shroud ring and said stationary part being opposed by each other with a certain clearance therebetween thereby to form said pressure attenuation chambers.

4. An apparatus as claimed in claim 1, wherein said water extracting pipe opening at its one end to said attenuation chamber second from the final one and at its other end to a draft tube.

5. An apparatus as claimed in claim 1, wherein said controller includes an operation amplifier adapted to receive signals representative of the changes in an upper and a lower dams, as well as a reference water head signal; and a comparator adapted to receive both of the output from said operation amplifier and a signal representative of a predetermined water head at which said valve is switched from the opened state to closed state and vice versa, and to produce a signal for opening or closing said valve in accordance with the result of comparison of the two input signals.

* * * * *